US009308605B2

(12) United States Patent
Jokinen et al.

(10) Patent No.: US 9,308,605 B2
(45) Date of Patent: Apr. 12, 2016

(54) BATTERY-OPERATED WELDING AND/OR CUTTING DEVICE AND A COOLING PROFILE (71) Applicant: KEMPPI OY, Lahti (FI)

(72) Inventors: Petteri Jokinen, Lahti (FI); Rauno Turunen, Lahti (FI); Ilkka Alhonsalo, Lahti (FI); Petri Korhonen, Lahti (FI)

(73) Assignee: KEMPPI OY, Lahti (FI)

( * ) Notice: Subject to any disclaimer, the term of this patent is extended or adjusted under 35 U.S.C. 154(b) by 0 days.

(21) Appl. No.: 14/360,077

(22) PCT Filed: Nov. 23, 2012

(86) PCT No.: PCT/FI2012/051161
§ 371 (c)(1),
(2) Date: May 22, 2014

(87) PCT Pub. No.: WO2013/076373
PCT Pub. Date: May 30, 2013

(65) Prior Publication Data
US 2014/0319111 A1  Oct. 30, 2014

(30) Foreign Application Priority Data

Nov. 23, 2011  (FI) .................................. 20116165

(51) Int. Cl.
*B23K 9/10*    (2006.01)
*B23K 37/00*   (2006.01)
*B23K 9/32*    (2006.01)
*H01M 10/6551* (2014.01)
*H01M 10/6554* (2014.01)
*H01M 10/6235* (2014.01)
*H01M 10/613*  (2014.01)

(52) U.S. Cl.
CPC ................. *B23K 37/003* (2013.01); *B23K 9/10* (2013.01); *B23K 9/1006* (2013.01); *B23K 9/32* (2013.01); *B23K 26/702* (2015.10); *B23K 26/703* (2015.10); *H01M 10/613* (2015.04);
(Continued)

(58) Field of Classification Search
USPC .................... 219/137 PS, 130.1; 427/120, 94
See application file for complete search history.

(56) References Cited

U.S. PATENT DOCUMENTS 6,225,596 B1 * 5/2001 Chandler et al. ........... 219/130.1
6,692,864 B1 * 2/2004 Dansui et al. ................. 429/120
(Continued)

FOREIGN PATENT DOCUMENTS

EP    1852206 A2   11/2007
EP    2339683 A2    6/2011
(Continued)

OTHER PUBLICATIONS

Finnish Search Report dated Oct. 30, 2012 corresponding to Finnish Patent Application No. 20116165.
(Continued)

*Primary Examiner* — Brian Jennison
(74) *Attorney, Agent, or Firm* — Squire Patton Boggs (US) LLP (57) ABSTRACT The object of the invention is a battery-operated welding and/or cutting device including a frame and at least one battery cell. The frame includes a cooling profile having an outer surface, which is in direct contact with the air surrounding the device. The cooling profile is provided to accommodate at least one battery cell, such that the cooling profile at least partly surrounds the battery cell in order to conduct heat from the battery cell to the cooling profile and, via the outer surface of the cooling profile, away from the device. The object of the invention is also a cooling profile.

23 Claims, 4 Drawing Sheets (52) U.S. Cl.
CPC ...... *H01M10/6235* (2015.04); *H01M 10/6551* (2015.04); *H01M 10/6554* (2015.04)

(56) References Cited

U.S. PATENT DOCUMENTS

| | | | |
|---|---|---|---|
| 2003/0164645 A1* | 9/2003 | Crandell, III | 307/80 |
| 2006/0088758 A1* | 4/2006 | Wu | 429/97 |
| 2011/0045326 A1 | 2/2011 | Leuthner et al. | |
| 2012/0156540 A1* | 6/2012 | Hsu | 429/120 |

FOREIGN PATENT DOCUMENTS

| | | |
|---|---|---|
| WO | WO 2009/029360 A1 | 3/2009 |
| WO | WO 2010/093256 | 8/2010 |

OTHER PUBLICATIONS

International Search Report dated Apr. 24, 2013 corresponding to International Patent Application No. PCT/FI2012/051161.

\* cited by examiner

FIG 4

BATTERY-OPERATED WELDING AND/OR CUTTING DEVICE AND A COOLING PROFILE

BACKGROUND OF THE INVENTION

An object of the invention is a battery-operated welding and/or cutting device.

An object of the invention is also a cooling profile.

Previously known are various portable welding devices, which are easily carried along even in awkward working locations, These portable welding devices are powered by connecting them to an ordinary electric outlet or to a generator. Thus, the welding device is then easy to take along, but at the work location proper, there will always be a connection by cable to a power supply, which limits the operation and the operating radius.

Previously known are also some battery-operated welding devices. Such battery-operated welding devices are disclosed in the publications WO 2009/029360 A1 and EP 1 852 206 A2.

From the publication WO 2009/029360 A1, a battery-operated welding device is known, which is provided in a trunk-like case such, that the welding device is easily portable from one location to another. In the invention according to the publication, the welding means and the battery needed for their operation are provided in the case, which protects them during transportation. According to the publication, also wire feeding means, means needed for recharging the battery and cooling means can be provided in the case. In battery-operated devices, heating of the batteries may constitute a problem, which, in this publication, has been solved by providing, in the upper portion of the case, a fan and a wind tunnel, which, with the air, removes battery-induced heat.

From the publication EP 1 852 206 A2, a cableless welding device and a cableless cutting device are known. The device according to the publication contains a first and a second battery, which are connected in parallel. However, the publication does not disclose any cooling of the batteries.

From the publication US 2011/0045326 A1, a device and a method for cooling a battery module are known. In the solution according to the publication, the battery module comprises a casing, in which the battery is provided, and means for cooling the battery such that cooling fluid is being conducted into the casing through at least one input and cooling fluid is being conducted out through at least one output, which cooling fluid can be pressurized air.

A problem in battery-operated devices, and particularly in welding and/or cutting devices requiring large momentary battery power, is the positioning of the batteries in the device in such a way that the heat produced by them would not cause problems to the device, the battery itself, nor to the user of the device. On the other hand, a problem is also, that a battery-operated welding and/or cutting device should be as small as possible, in order to being easily portable, and then there is no space for proper cooling means in the device. For a battery-operated device there is always a desire for as long as possible an operation time without mains current, as well as for as long as possible a lifetime for the battery. As batteries heat excessively, their lifetime is reduced, and then they have to be replaced sooner There may also be problems in regard to fire safety, since some battery chemistry is unstable when heated. Portable devices are designed to have small dimensions for ease of use, and then there is no desire to leave superfluous space around the batteries. Then the batteries will be located close to each other in the device causing local heating in the device lacking proper cooling. As the batteries heat up, the heat is transferred into their vicinity, and then also the device itself may get hot causing damage to the structures or indirectly causing a skin burn to the user of the device. On the other hand, from the viewpoint of the ease of use of battery-operated welding and/or cutting devices, there is a desire to keep the size of the device as small as possible, and then there is no space to be found for a separate cooling device.

BRIEF DESCRIPTION OF THE INVENTION

An objective of the invention is to solve the aforementioned problems.

The objective of the invention is achieved by means of the battery-operated welding and/or cutting device, and, also a cooling profile.

The battery-operated welding and/or cutting device comprises a frame and at least one battery cell, which frame comprises a cooling profile having an outer surface being in direct connection with the ambient air around the device, and which cooling profile is provided to accommodate at least one battery cell such, that the cooling profile at least partly surrounds the battery cell for conducting heat from the battery cell to the cooling profile and out of the device via the outer surface of the cooling profile. Preferably, the outer surface of the cooling profile at least partly constitutes the outer surface of the device. Preferably, the cooling profile comprises a coat and/or a coating such, that said coat and/or coating constitutes at least part of the outer surface of the cooling profile. Thus, the cooling profile can have a sandwich structure, for example, and then its outer surface can be formed by foil coating or some other corresponding coat.

The battery-operated welding and/or cutting device comprises a frame, which frame comprises a cooling profile having an outer surface and which outer surface at least partly constitutes the outer surface of the welding and/or cutting device. The cooling profile is provided to accommodate at least one battery cell such that the cooling profile at least partly surrounds the battery cell, and that the battery cell is in contact with the cooling profile directly and/or via a solid medium and/or via another battery cell such that heat is being conducted from the battery cell to the cooling profile, from which cooling profile heat can be conducted to the air via the outer surface of the cooling profile. Thus, heat is being conducted from the battery cell to the cooling profile, and away from the cooling profile via the outer surface of the cooling profile. The cooling profile is provided in the welding and/or cutting device such that the outer surface of the cooling profile constitutes part of the outer surface of the welding and/or cutting device.

The cooling profile is adapted to transfer heat, generated in the battery cell, out of the battery cell. In other words, heat generated in the battery cell is conducted out of the battery cell via the cooling profile. According to the invention, the cooling profile is adapted to accommodate one or more battery cells in its interior such that the battery cell at least partly is situated inside the cooling profile and/or is surrounded by the cooling profile. According to a preferable embodiment, adjacent battery cells are at least partly separated from each other by the structure of the cooling profile. The cooling profile is adapted to transfer, via its structure, heat generated in the battery cell into the cooling profile and, via the outer surface of the cooling profile, into the environment, for example the ambient air. Preferably, a single battery cell is provided in the cooling profile such that heat is allowed to be transferred from at least one of the faces of the battery cell into the profile with no air gap in between, which would impair the heat transfer, or without another battery cell being in immediate contact with it.

According to another preferable embodiment, battery cells are provided in the cooling profile such, that two battery cells, for example, are situated in the same cavity in the cooling profile, and then the battery cells at least partly touch each other.

The cooling profile is preferably adapted to accommodate at least one battery cell such that a frictional connection or a positive locking is created between the battery cell and the cooling profile. Then, the battery cell is in contact with the cooling profile, which enhances the heat transfer from the battery cell to the cooling profile.

According to one embodiment, the cooling profile consists of two or more mutually interconnectable parts. Then, the cooling profile can be opened for inserting a battery cell into it, after which it can be closed. The parts of the cooling profile are attached to each other by means of screws, for example, or by means of a locking mechanism that can be opened and closed.

The heat transfer ability of the cooling profile is based on the material it is made of.

The cooling profile is preferably made of a metal or a metal alloy, like, for instance, aluminium or an aluminium alloy, which may contain inter alia copper, but also other metals that conduct heat well are suitable as material for the cooling profile. Also, other heat well conducting materials than metals are suitable as material for the cooling profile. The distance between the battery cell and the cooling profile also influences the thermal conductivity. The battery cell is provided in the cooling profile such that the battery cell is in contact with the cooling profile directly and/or via some solid medium such that heat is conducted from the battery cell into the cooling profile. The battery cell can be directly touching the cooling profile, or there may be some other solid material having good thermal conductivity between the battery cell and the cooling profile, such as thermally conducting paste, for example silicone paste, which seals the remaining space between the cooling profile and the battery cell.

The structure of the cooling profile is preferably such that heat is allowed to be easily conducted into the cooling profile from a battery cell located inside it. The heat in the cooling profile can be transferred into the ambient air. In view of the thermal conductivity, the most important aspect is sufficient thermal capacity of the cooling profile. The outer surface of the cooling profile can be of any kind, for example ribbed or smooth. According to one embodiment, there is at least one rib on the outer surface of the cooling profile. Some of the mass of the cooling profile can be eliminated by means of a ribbed outer surface of the cooling profile, since the ribbing increases the outer surface area dissipating the heat of the cooling profile. On the other hand, the cooling profile can have such a large mass, that it can accept a large portion of the heat in itself, this, for example, in a situation, where the cooling profile constitutes the entire frame, or almost the entire frame, of the device.

The cooling profile has an outer surface, which at least partly constitutes the outer surface of the welding and/or cutting device. Additionally the welding and/or cutting device preferably comprises a cover structure, which is attachably provided to the outer surface of the cooling profile such, that the cooling profile constitutes part of the outer surface of the device. The device can also comprise welding device components and/or welding additives being provided at the cooling profile and/or the cover structure.

At least part of the outer surface of the cooling profile or at least one of the outer faces of the cooling profile can form an end surface, via which end surface the battery cell can be provided into the cooling profile, preferably at least partly or completely inside the cooling profile. Additionally, welding device components, welding additives and/or cover structures can be attached to the end surface. As a cover structure can serve, for example, just an end piece containing a display and/or controls. The outer surface of the cooling profile can comprise several end surfaces. The end surface of the cooling profile can constitute, at least partly, a portion of the outer surface of the device. The battery cells inside the cooling profile can be interconnected via the end surface of the cooling profile, for example in such a way that two or more serially connected battery cells are provided in the cooling profile.

The battery-operated welding and/or cutting device according to the invention preferably comprises a control and display element, which is provided on the outer surface of the cooling profile and/or of the cover structure. The control and display element comprises a control portion and a display portion, which control portion is provided to be rotated in relation to the display portion. The display portion is provided to be turned in relation to the frame such that the display portion possesses a first, at least one, position in relation to the frame, in which the welding and/or cutting device is being switched off, and another, at least one, position, in which the welding and/or cutting device is being switched on.

A preferable method for manufacturing a cooling profile is by extruding it to a desired shape. Through openings, for example, in the cooling profile for the battery cells can be provided in the cooling profile by means of extrusion. One preferable shape for a cooling profile is such, wherein locations for battery cells are provided on, top of each other into a shape of a tower or corresponding shape such that there is a wall between two vertically adjacent battery cell locations. However, the invention is not restricted to any particular shape of cooling profile, and batteries or battery cells of any shape can be used in the cooling profile. The cooling profile can be formed into a cylindrical shape, for instance. According to a preferable embodiment, the cooling profile is essentially cylindrical such that the cross section is round, elliptic or a polygon.

One cooling profile shape can be, for example, a cylinder in the shape of a hexagon. The cooling profile can also be made out of one or more pieces. The cooling profile can also be designed such, that a carrying strap and/or carrying straps can be attached to it and/or it can have a structure, for example, well suited for being carried on one's back. In other words, the shape of the frame of the welding and/or cutting device, particularly the cooling profile, is suitable for being carried on one's back.

In a preferable embodiment of the invention, the battery cells are provided in the cooling profile such that the battery cells cannot touch each other except for the connections. This can be accomplished, for example, such that a dedicated slot for each battery cell is provided in the cooling profile. In other words, in this example, the structure of the cooling profile separates the battery cells from each other. In another embodiment the battery cells are provided in the cooling profile such that the structure of the cooling profile only partly separates the battery cells from each other. In a third possible embodiment, at least two battery cells are provided in the cooling profile in the same space, and then the battery cells are partly in contact with each other and partly with the cooling profile.

One or more battery cells are provided in the cooling profile such that the cooling profile protects the battery cell, and heat generated by the battery cell is allowed to be transferred via the cooling profile out of the battery cell. According to a preferable embodiment, the battery cells are laminated or otherwise provided directly attached to the cooling profile. In case the battery cells are laminated to the cooling profile, or if the arrangement otherwise is such, that they are permanently fixed in the cooling profile, individual battery cells cannot be replaced, whereby there is a guarantee for having batteries of equal value. According to a much preferred embodiment, a battery cell or battery cells are permanently provided in the cooling profile, which cooling profile serves as the frame of the welding device. Then the complete cooling profile can be detached from the welding device and be replaced by a fresh cooling profile including new battery cells. In other words, in a welding device comprising a frame serving as a cooling profile and a cover structure, the cooling profile can be detached from the cover structure and be replaced.

A welding and/or cutting device comprising a frame and at least one battery cell is in accordance with its preferable embodiment such that the frame is formed by the cooling profile. Then, the outer surface of the cooling profile at least partly serves as the outer surface of the welding and/or cutting device. Welding additives associated with the welding device, such as for example covered electrodes, can be attachably provided to the cooling profile, for instance at its end surface. A cover structure can be provided to protect the welding device components, such as the electronics, the power components or other components associated with the welding device, and/or the welding additives. Such a cover structure can be attached to the end surface of the cooling profile or, in case there are several end surfaces, the cover structure also can be composed of several parts being attached to the end surfaces of the cooling profile. The purpose of the cover structure is to protect the battery cells provided in the cooling profile and their wirings as well as other welding device components and/or welding additives attached to the cooling profile. Operation of the connections, the display and the operating switches of the welding device can be provided via the cover structure. Alternatively, the welding additives associated with the welding device, such as for example covered electrodes, can be located inside the cooling profile, for instance in a space provided in the cooling profile. Storage space for additives to be used in welding, such as for covered electrodes in MMA welding, can also be located in the cooling profile.

In a solution according to the invention, the frame of the battery-operated welding device forms the cooling structure for one or more battery cells. Thus, the frame of the welding device comprises a cooling profile, into which cooling profile at least one battery cell is inserted, which battery cell comprises at least one electrochemical element. Preferably, the frame of the welding device is composed mainly of the cooling profile as well as of a cover structure and/or additional structure provided to the cooling profile. The cooling profile has got an outer surface forming part of the outer surface of the welding device, and at least one end surface, via which end surface the battery cell is provided or has been provided at least partly into the cooling profile. In the cooling profile there may be one or more battery cells inserted into the cooling profile such that each battery cell has got its own place in the cooling profile such that adjacent battery cells are separated from each other at least partly by means of the frame structure of the cooling profile. Preferably, the battery cells are provided in the cooling profile such that the battery cells are connected in series such that only the couplings are provided outside the cooling profile or at the end surface of the cooling profile. Preferably, most of the battery cell structure is provided inside the cooling profile. Thus, one or more battery cells can be provided in the cooling profile, preferably the cooling profile being provided to accommodate 6-18 battery cells, which can be connected in series. There can be, for example, 6-12 battery cells, or, for example 12-18 cells, the number of battery cells being possibly even larger, but, for example, 18 battery cells connected in series is sufficient for a welding device, if one battery cell is about 3 V. The nominal current of a welding device is typically 50-200 amperes.

In other words, in a solution according to the invention, the frame of the welding device forms a cooling structure for one or more batteries or battery cells to be used in the welding device such that the heat being generated in the battery or the battery cell is transferred out of the welding device via the cooling profile. In particular, the heat is being transferred out of the welding device via the outer surface of the cooling profile the outer surface of the cooling profile forming at least part of the outer surface of the welding device.

Thus the battery-operated welding device according to the invention comprises a frame comprising a cooling profile, into which one or more battery cells are provided. One or more cover structures can be detachably attached to the cooling profile serving as the frame of the welding device, preferably at an end surface or end surfaces of the cooling profile. This cover structure protects welding device components and/or welding additives attachably provided to the cooling profile.

By means of a preferable embodiment of the invention, the advantage is attained, that the heat generated by the battery cells will efficiently be conducted away from each battery cell, since the structure of the cooling profile extends to each battery cell. Also, the size of the welding device can be kept compact, since there is no need for separate cooling devices for cooling the battery cells, the frame of the welding device simultaneously serving as a cooling element.

LIST OF FIGURES

Below, some preferable embodiments of the invention are presented in greater detail referencing the attached figures, of which

DETAILED DESCRIPTION OF THE INVENTION

Figure 1:
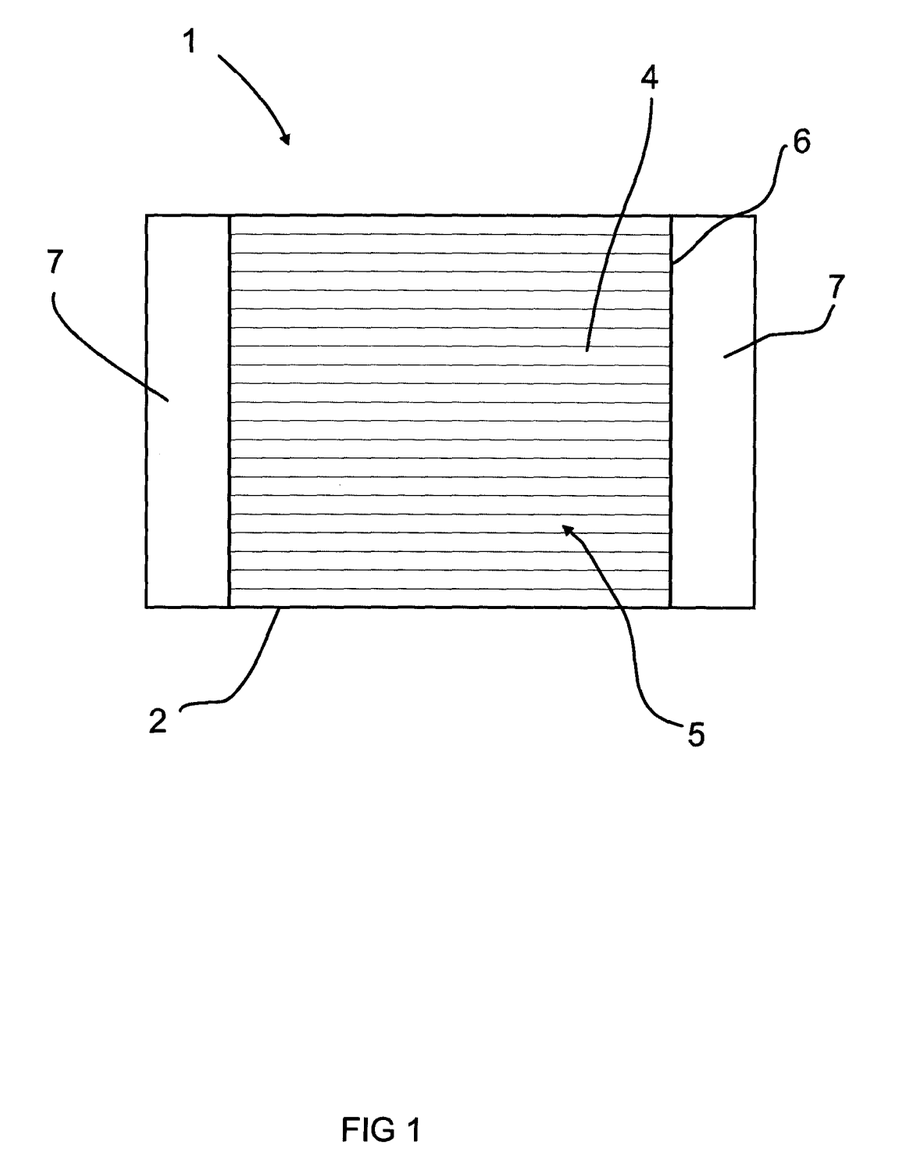
FIG. 1 shows a preferable embodiment of a battery-operated welding device according to the invention.

FIG. 1 shows a battery-operated welding and/or cutting device 1 comprising a cooling profile 4 serving as a frame 2 of the device 1, into which cooling profile 4 one or more battery cells (not shown in the Figure) have been provided. In this example, the cooling profile comprises two end surfaces 6, at both of which a cover structure 7 has been attachably provided. These cover structures 7 protect welding device components and/or welding additives as well as the connections of the battery cells being located between the cooling profile 4 and a cover structure 7. The outer surface 5 of the cooling profile 4 serves as the outer surface of the device 1, whereby the battery cells inserted in the cooling profile 4 deliver heat directly to the ambient air via the outer surface 5 of the cooling profile 4.

Figure 2:
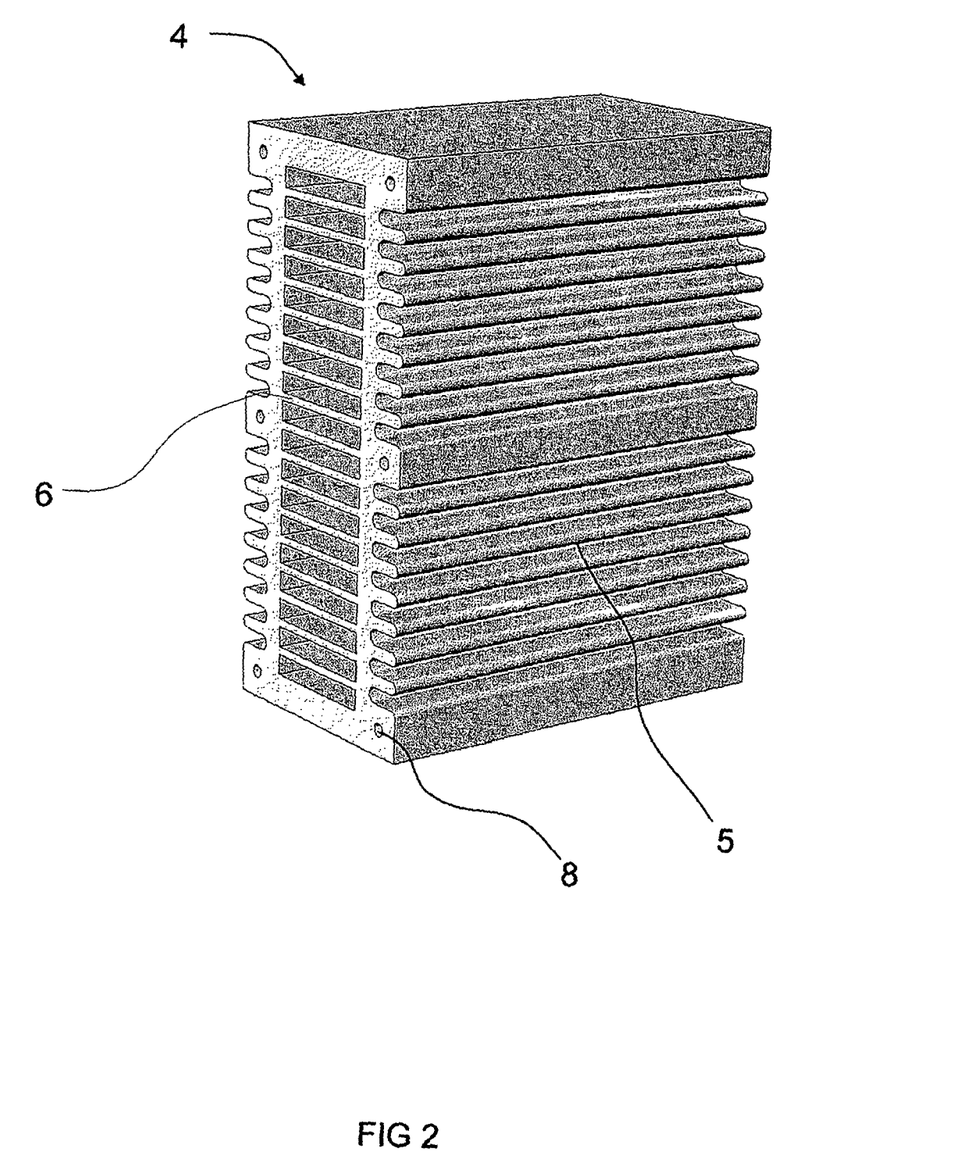
FIG. 2 shows a preferable embodiment of a cooling profile according to the invention.

FIG. 2 shows a preferable embodiment of a cooling profile 4 according to the invention, into which cooling profile 4 at least one battery cell (not shown in the Figure) can be inserted. In this figure, 18 positions for battery cells have been provided in the cooling profile 4 such that the battery cells can be inserted into the cooling profile 4 via the end surface 6 of the cooling profile 4. In this examplary embodiment, the outer surface of the cooling profile 4 is preferably made to be ribbed, but it can also be of a different kind. Attachment spots 8 for a cover structure 7 have been provided at the end surface 6 of the cooling profile 4.

Figure 3:
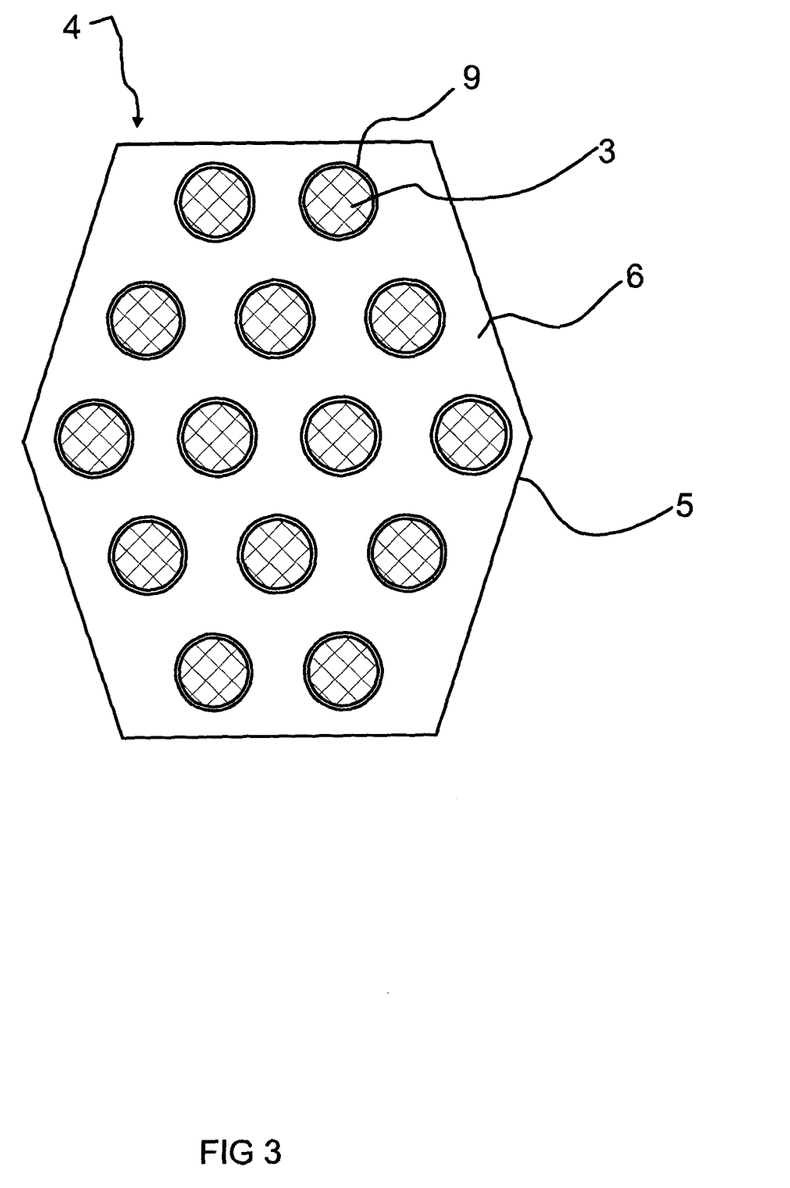
FIG. 3 shows a second preferable embodiment of a cooling profile according to the invention.

FIG. 3 shows a second embodiment of a cooling profile 4 according to the invention, in which embodiment 14 battery cells 3 have been provided at least partly inside the cooling profile 4 from the end surface 6 of the cooling profile 4, which battery cells 3 each have their own location 9 in the cooling profile 4 such that adjacent battery cells 3 do not touch each other. Heat generated in the battery cells 3 is conducted via the structure of the cooling profile 4 to the outer surface 5 of the cooling profile 4, and via that the heat is transferred to the ambient air. The gap between the battery cell 3 and the location 9 for the battery cell 3 located in the cooling profile 4 can be tight, at least partly such that the battery cell 3 is in direct contact with the cooling profile 4, or a sealant, like some heat conducting paste, e.g. silicone grease or other such material, can be provided between the battery cell 3 and the cooling profile 4.

Figure 4:
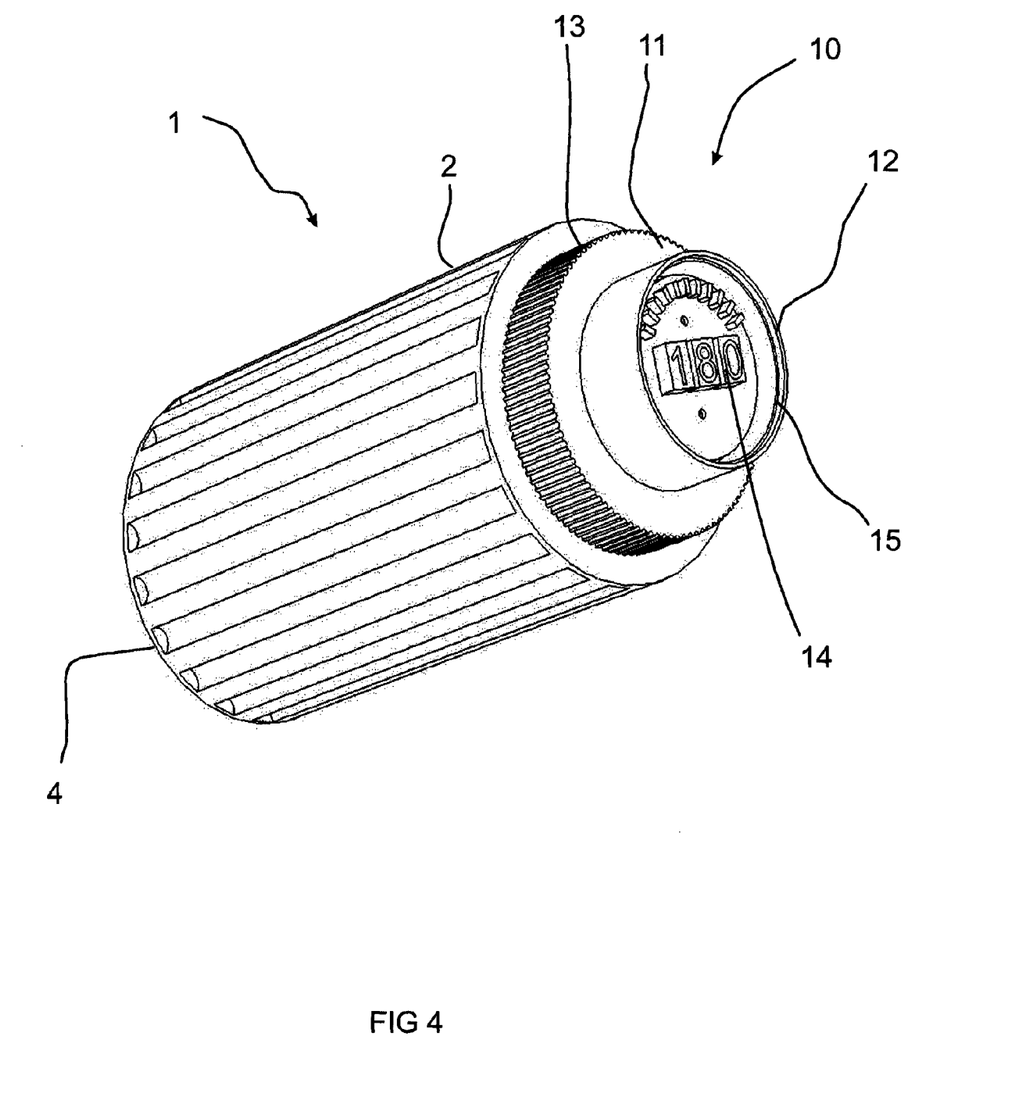
FIG. 4 shows an embodiment of a battery-operated welding and/or cutting device according to the invention, containing a control and display element.

FIG. 4 shows a battery-operated welding and/or cutting device 1 according to the invention, which device is provided with a display and control element. In this embodiment, the frame 2 of the device 1 is entirely formed of a cooling profile 4, into which the display and control element 10 for the welding power is attachably provided. The display and control element 10 comprises a display part 12 comprising a display 14 and a frame 15 allowing the display 14 to be turned, and a control part 11 comprising a welding power regulator 13. The welding power regulator 13 is preferably an independent frame-like element surrounding the display 14 but moving separately from the display 14, the element being rotatable in relation to the display 14. Preferably, as the welding power regulator 13 is being turned in relation to the display 14, the display 12 and the frame 15 remain stationary. Preferably, as the regulator 13 is being turned, also the frame 2 remains stationary. By turning the welding power regulator 13, the electric power to be extracted from the battery cells is decreased or increased. In other words, the desired welding current is being set by means of the regulator 13, and then the set welding current value is expressed on the display 14. According to a preferable embodiment, turning of the frame 15 of the display 14 acts as the main switch of the welding and/or cutting device 1. The frame 15 of the display 14 can move without the display 14 moving, or then such that the display 14 and the frame 15 move in unison. Preferably, the device 1 can be switched on in a certain position of the frame 15 and off in a certain other position of the frame 15. There may be several on-positions, as well as several off-positions. According to a preferable embodiment, switching on occurs in two different positions, which are at an angle of approximately 180° in relation to each other, i.e. at an angle of 90° from the switching off position in a clockwise or counter-clockwise direction, and then the display 14 can be turned around when needed for the welding position.

To a person skilled in the art, it is obvious, that, as the technology advances, the basic idea of the invention can be implemented in many different ways. Thus, the invention and its embodiments are not restricted to the examples described above, but rather, they can vary within the scope of the patent claims.

The invention claimed is:

1. A battery-operated welding device, which device comprises a frame and at least two battery cells, wherein the frame comprises:
    a cooling profile having an outer surface, which is in direct connection with the air surrounding the device,
    wherein the cooling profile is provided to accommodate at least two battery cells such that the cooling profile at least partly surrounds each of the at least two batter cells in order to conduct heat out of the at least two battery cells into the cooling profile and, via the outer surface of the cooling profile, out of the device, and
    wherein distance from the at least two battery cells to the cooling profile is equal;
    the welding device further comprises a control and display element, which is provided at the outer surface of the cooling profile.

2. Battery-operated welding device according to claim 1, wherein the outer surface of the cooling profile at least partly is the outer surface of the device.

3. Battery-operated welding device according to claim 1, wherein the cooling profile comprises a coat or a coating such that said coat or coating constitutes at least part of the outer surface of the cooling profile.

4. Battery-operated welding device according to claim 1, wherein the at least two battery cells are directly, or via a solid medium, or via another of the at least two battery cells, in connection with the cooling profile for conducting heat from the at least two battery cells to the cooling profile.

5. Battery-operated welding device according to claim 1, wherein the frame is formed by the cooling profile.

6. Battery-operated welding device according to claim 1, wherein the device additionally comprises a cover structure, which is attachably provided to the outer surface of the cooling profile such that the cooling profile forms part of the outer surface of the device.

7. Battery-operated welding device according to claim 6, wherein the device comprises welding device components or welding additives, which are provided at the cooling profile or at the cover structure.

8. Battery-operated welding device according to claim 6, wherein the device comprises a control and display element, which is provided at the cover structure.

9. Battery-operated welding device according to claim 8, wherein the control and display element comprises a control part and a display part, which control part is provided to be rotated in relation to the display part.

10. Battery-operated welding device according to claim 8, wherein the display part is arranged to be rotated in relation to the frame such, that the display part possesses at least one position in relation to the frame, in which position the welding device is being switched off, and another at least one position, in which the welding device is being switched on.

11. Battery-operated welding device according to claim 1, wherein the cooling profile is essentially cylindrical in shape such, that the cross section is circular, elliptic or a polygon.

12. Battery-operated welding device according to claim 1, wherein at least one of the outer surfaces of the cooling profile forms an end surface, through which end surface a battery call is provided into the cooling profile.

13. Battery-operated welding device according to claim 1, wherein two or more serially connected battery cells are provided into the cooling profile.

14. Battery-operated welding device according to claim 1, wherein thermally conducting paste is provided between the at least two battery cells and the cooling profile.

15. Battery-operated welding device according to claim 1, wherein the at least two battery cells are permanently provided in the cooling profile.

16. Battery-operated welding device according to claim 1, wherein space for welding additives, such as covered electrodes, is provided into the cooling profile.

17. Battery-operated welding device according to claim 1, wherein the cooling profile is detachable and replaceable from the frame structure.

18. A cooling profile, having an outer surface, wherein the cooling profile is provided to accommodate at least two battery cells such, that the cooling profile at least partly surrounds each of the at least two battery cells, and that the at least two battery cells are directly, or via a solid medium, in contact with the cooling profile such, that heat is conducted from the at least two battery cells to the cooling profile and via the outer surface of the cooling profile out of the cooling profile, and which cooling profile is provided in a welding device such, that the outer surface of the cooling profile is part of the outer surface of the welding device,
   wherein a distance from the at least two battery cells to the cooling profile is equal, and
   wherein a control and display element is provided at the outer surface of the cooling profile.

19. Cooling profile according to claim 18, wherein there is at least one rib on the outer surface of the cooling profile.

20. Cooling profile according to claim 18, wherein the outer surface of the cooling profile is ribbed.

21. Cooling profile according to claim 18, wherein the cooling profile is adapted to accommodate the at least two battery cells such that a frictional connection or a positive locking is created between the at least two battery cells and the cooling profile.

22. Cooling profile according to claim 18, wherein the cooling profile is composed of two or more parts that can be attached to each other.

23. Cooling profile according to claim 18, wherein the cooling profile is arranged to accommodate 6 to 18 the at least two battery cells, which can be serially connected.

* * * * *